June 1, 1948. W. C. SHRIVER 2,442,516
COMPRESSION MOLD
Filed Feb. 4, 1946 2 Sheets-Sheet 1

INVENTOR.
William C. Shriver
BY
Wilkinson & Mawhinney
Attorneys

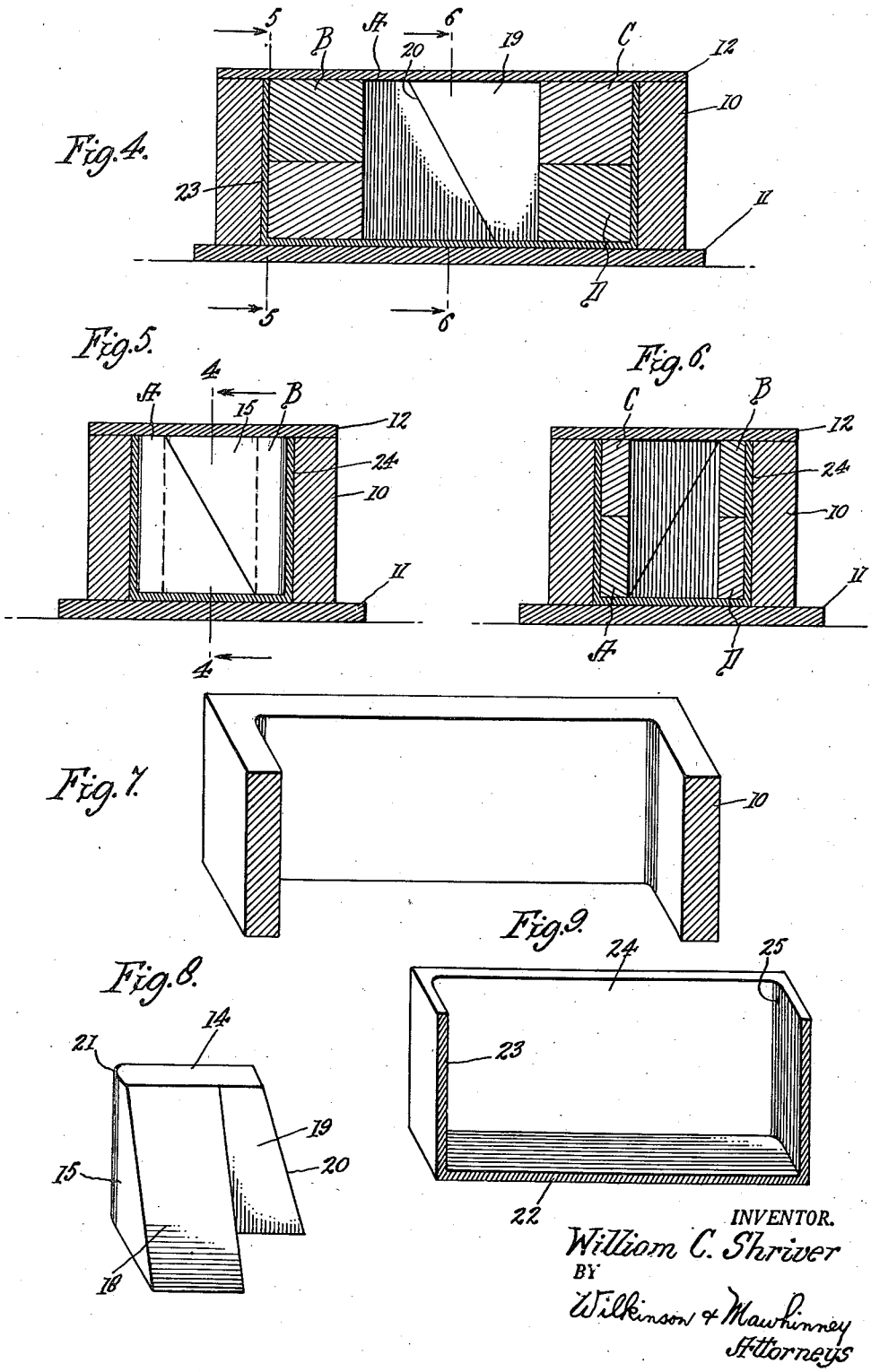

Patented June 1, 1948

2,442,516

UNITED STATES PATENT OFFICE 2,442,516

COMPRESSION MOLD

William C. Shriver, Huntington, Ind.

Application February 4, 1946, Serial No. 645,393

3 Claims. (Cl. 18—34)

The present invention relates to improvements in compression molds and has for an object to provide an improved mold for laminated plastic forms, for instance, small type forms in which difficulty has been experienced in securing regularity in wall formation.

An object of the invention is to provide an improved mold in which wedges are employed to convert the downward pressure of the hydraulic press into equalized pressures from the center or core of the mold outwardly against the sides and ends of the mold box, thus enabling the procurement of a form whose opposed sides are parallel.

Heretofore the apparatus used in the molding of such forms did not permit the molding of the opposing sides parallel but required several degrees draft in order to accommodate the bulk of the uncompressed material used in the fabrication of this form, The use of the internal or core wedges acting to develop an outward pressure makes a much finer product with a better finish and more acceptable to the trade than even where the wedges are used externally to develop the pressure toward the center of the mold.

The invention also contemplates a simple form of mold with a simple form of wedge structure in which the several wedge units are identical in form whereby they may be readily interchangeable and may be produced in large quantities at low cost.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of a mold with the top raised and the wedges in the fully expanded position, all in accordance with the present invention;

Figure 4 is a longitudinal central section taken through a mold box and its top after being subjected to final compression and with the molded article shown in the mold cavity;

Figure 5 is a transverse section taken on the line 5—5 in Figure 4;

Figure 6 is a similar view taken on the line 6—6 in Figure 4;

Figure 7 is a fragmentary perspective view of a form of mold box which may be employed;

Figure 8 is a perspective view of one of the four identical wedges employed, and Figure 9 is a perspective view with parts broken away and parts shown in section of an improved type form as produced by the improved mold.

Figure 1:
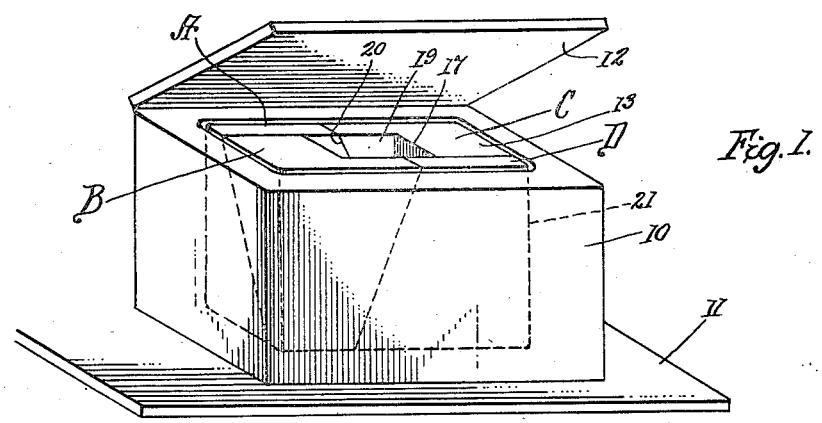

Referring more particularly to the drawings, 10 designates a mold box of any desired form having a base 11 and a removable top 12.

The core of the mold is made up of four identical wedges A, B, C and D.

All of these identical wedges are made as shown in Figure 8 in which blocks of wood, metal or other appropriate material are of tapering form provided each with a broad base 13 of approximately rectangular form. The block has a narrow top edge 14 and vertical end and side walls 15 and 16 which are external to the block. On its inner side the block is provided with an inside wall 17 which is substantially parallel with the external end wall 15. An inclined wall 18 slopes from the narrow top 14 down to the wide base 13.

The block is made with an extension web 19 forming a prolongation of the side wall 16 and terminating in a tapered edge 20 which tapers from the broad base toward the upper narrow edge 14. The block is made with a rounded corner or edge 21 at the external corner portion of the block.

Referring particularly to Figure 9, the fabricated article or form is shown to have a bottom 22, end walls 23, side walls 24 and rounded inside corners 25.

The mold is made up of six pieces, there being four of the identical wedge members A, B, C and D, the mold box with its integral or separable base 11 and the removable top 12. This top 12 is a flat piece that covers the entire mold and against which the pressure is applied from the top downwardly, the pressure being developed for instance in a hydraulic steam press.

The laminated article in its first formative state is first cold-pressed in a mold which may have a solid core and external wedge presses. The laminated plastic form in such premolded state is then introduced to the mold box 10 with its bottom 22 resting upon the bottom 11 of the mold.

Two of the four identical wedges A and D (Fig. 3) are then placed in opposite corners of this mold and premolded article and the other two wedge members B and C inverted and placed in the two opposing remaining corners and diagonal to each other. The top plate 12 is then placed on top of the inverted bottoms 13 of the wedge members B and C and the mold is placed in a hydraulic press in which the ram may engage the top plate 12. Pressure being applied, the wedges B and C are forced down from the positions shown in Figures 2 and 3 to that shown in Figure 1. As the wedges B and C are forced down they are forced out and they cooperate to similarly force out the companion wedges A and D. This forcing out takes place in two directions at right angles to one another. In other words, due to the inverted arrangement of adjacent wedges, the inclined surfaces 20 of the wedges B and D will cause such wedges B and D to be expanded in a longitudinal direction while the tapering walls 18 of the wedges A and B and C and D will cause the wedges to be expanded in a lateral direction at substantially right angles to the direction of expansion occurring by reason of the action of the tapered walls 20. This longitudinal and lateral expansion of the wedges occurs without creating any gap in the external walls 15 and 16. These walls are interrupted only by the relatively reverse inclined meeting edges of the walls 18 and 20 but this is found to have no effect in the molded article. In other words, the continuity of the external walls 15 and 16 of the wedge core is substantially unimpaired by the fact that the wedges are relatively movable both longitudinally and laterally in the expansive action of the core within the mold box and within the premolded article. The application of hydraulic pressure upon the wedges will produce great force and the core will be expanded with equal pressure in all directions so as to form uniformly thick walls 23, 24 of the article shown in Figure 9 with the pressure distributed equally throughout all areas of these walls 23 and 24. In other words, the external walls 15 and 16 of the wedges form the inside surface wall of the core box. These walls 15 and 16 fit directly against the inside surfaces of the walls 23 and 24 of the article being molded. The external surfaces of the walls 23 and 24 are tightly pressed by the expanding wedge core against the inside surfaces of the mold box 10.

Figure 2:
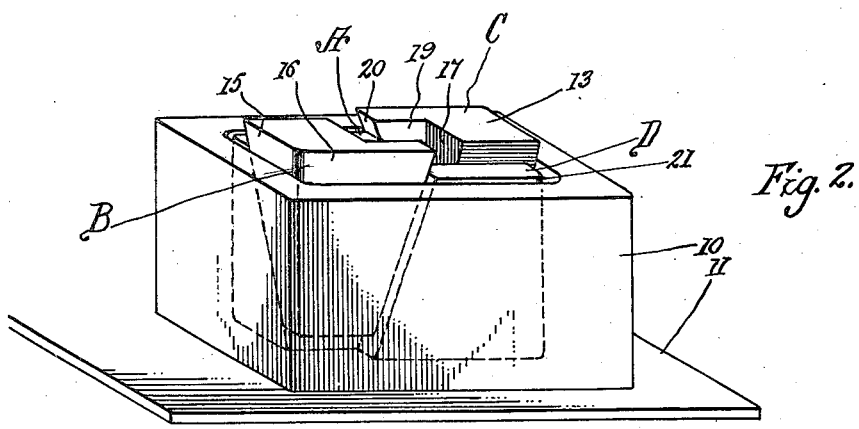
Figure 2 is a perspective view of the mold box with wedges in an initially placed position before subjecting the same to pressure.
Figure 3:
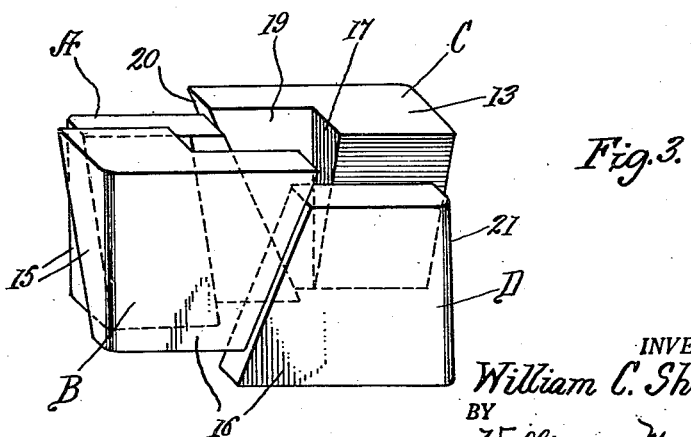
Figure 3 is a perspective view of the congregation of wedges in the initially placed positions.

It will be noted that the webs 19 are thinner in a lateral or transverse sense as compared with the bulk of the wedge blocks, which relative construction results in the formation of the inside walls 17. When the four blocks are assembled, this same construction produces an internal central space circumscribed by the several webs 19 and the several inside walls 17 of the four blocks. This hollow central part of the core enables the core to collapse or to contract. Figures 2 and 3 show the contracted condition of the core and Figure 1 shows the expanded condition thereof.

From an inspection of Figure 9, it will be seen that after compression in the improved mold, a molded box will be of uniform wall construction and that it will have round corners 25. The outside of the box produced in the mold shows no seams or uneven places whatsoever. All such seams or uneven places are confined to the interior of the box where the seams are not noticeable. One reason why the box is more acceptable to the trade than conventional boxes is that it possesses these rounded corners 25 as against the square corners in the former boxes.

It is obvious that various changes and modifications may be made in the details of construction and design of the above specifically described embodiment of this invention without departing from the spirit thereof, such changes and modifications being restricted only by the scope of the following claims.

I claim:

1. A compression mold comprising a mold box having a base and an open top adapted to receive a premolded article, an expansible and retractile core mounted removably in said box and in the premolded article therein, said core comprising four identical blocks, each block comprising a broad base of approximately rectangular form and a narrow top edge, vertical end and side walls which are external to the block and core, an inside wall on the block substantially parallel with the external end wall, an inclined wall sloping from the narrow top down to the wide base, an extension web on the block forming a prolongation of the side wall and terminating in a tapered edge which tapers from the broad base toward the narrow edge, two of the blocks in the core being diagonally disposed and resting on their broad bases in an upright position upon the premolded article, the other two blocks disposed in the other two corners of the premolded article being inverted with their narrow edges disposed downward, and a top for the box for engaging the upwardly disposed parts of the four wedges.

2. A compression mold as claimed in claim 1 characterized by the fact that the external corner portions of the blocks are rounded.

3. A compression mold as claimed in claim 1 wherein the block and its extension form mutually right-angularly arranged internal walls bounding an inner open central space which is enlarged or diminished in accordance with the expanded or collapsed position of the component blocks whereby such space is always left open for the free movement of the blocks relatively to one another.

WILLIAM C. SHRIVER.

REFERENCES CITED

The following references are of record in the file of this patent:

UNITED STATES PATENTS

| Number | Name | Date |
| --- | --- | --- |
| 1,371,525 | Strausbaugh | Mar. 15, 1921 |
| 1,599,524 | Hall et al. | Sept. 14, 1926 |
| 1,645,729 | Vaughan | Oct. 18, 1927 |
| 2,118,080 | Goodwin | May 24, 1938 |